Dec. 24, 1935.  J. T. RUTHERFORD  2,025,401
PROCESS OF MANUFACTURING AMMONIUM SULPHATE AND DENATURANT FROM
ACID SLUDGES PRODUCED IN THE TREATMENT OF PETROLEUM
Filed April 4, 1932
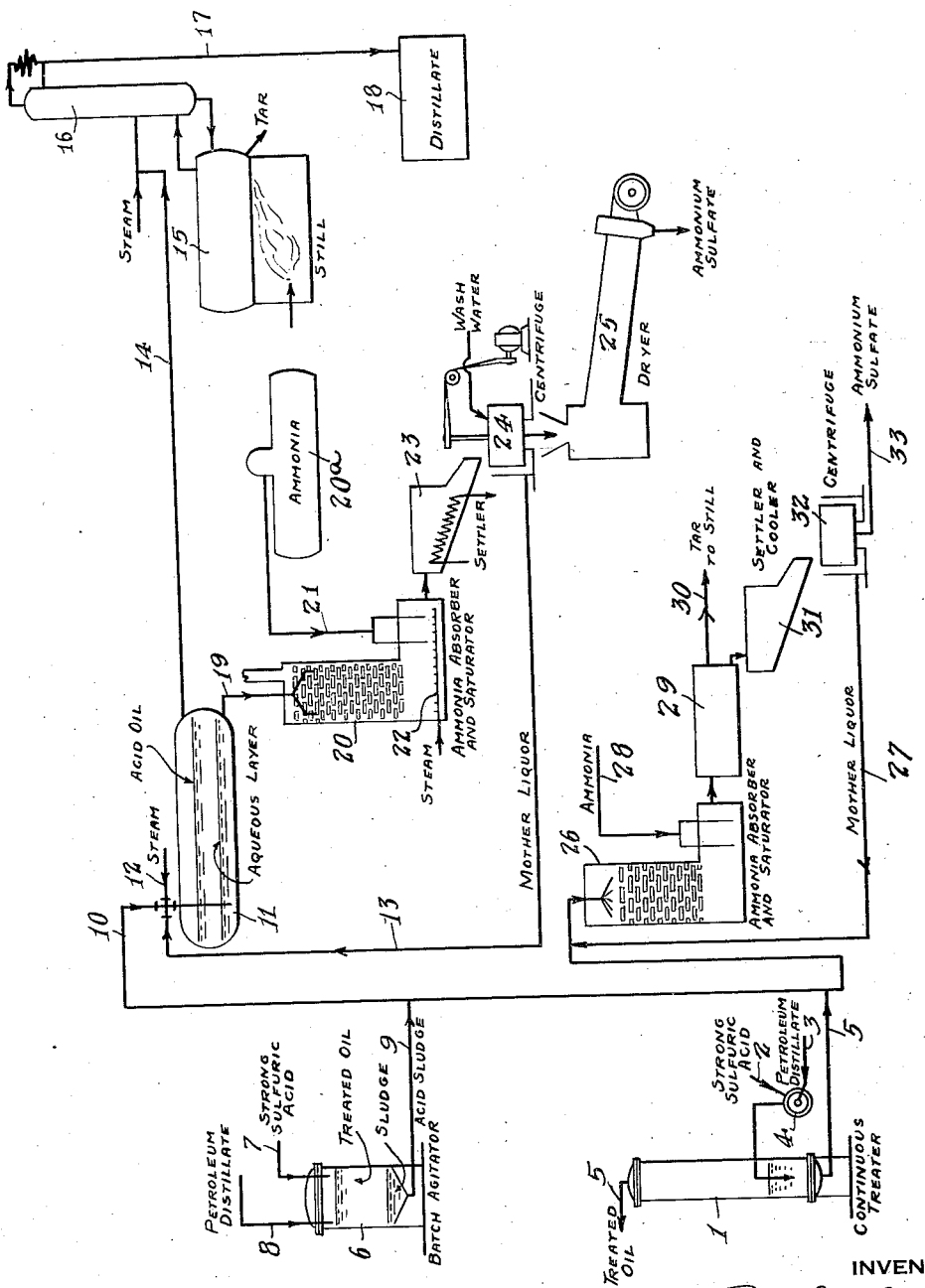
INVENTOR.
John T. Rutherford
BY Lyon+Lyon
ATTORNEYS Patented Dec. 24, 1935

2,025,401

UNITED STATES PATENT OFFICE 2,025,401

PROCESS OF MANUFACTURING AMMONIUM SULPHATE AND DENATURANT FROM ACID SLUDGES PRODUCED IN THE TREATMENT OF PETROLEUM

John T. Rutherford, Berkeley, Calif., assignor to Standard Oil Company of California, San Francisco, Calif., a corporation of Delaware Application April 4, 1932, Serial No. 603,228

8 Claims. (Cl. 23—119)

This invention relates to a process of manufacturing ammonium sulphate and a denaturant from the sulphuric acid sludges derived in the treatment of petroleums.

The present method of manufacturing ammonium sulphate consists in passing ammonia through a dilute solution of sulphuric acid and maintaining the saturator at about 220° F. The ammonium sulphate produced is crystallized from the saturated solution, dried and washed with water. The mother liquor is re-cycled and 66° Baumé acid added to compensate for the sulphuric acid which is combined with ammonia.

The heat evolved during the reaction evaporates the excess water used in washing and the water added with the acid. If acids weaker than 66° Baumé are used, it is necessary to supply heat in addition to that evolved during the reaction for evaporation of additional water in the acid.

I have discovered that sulphuric acid sludges derived from the treatment of petroleum oils with relatively strong acids can be used as the make-up acid in the process of making ammonium sulphate, and at the same time, by the addition of certain steps, it is possible to secure as a product of the process an acid oil which is of great value as an odorant or denaturant. Acid sludges from the treatment of petroleum with relatively strong acids contain very little water and can be used in the manufacture of ammonium sulphate without additional heat requirements.

The sulphuric acid sludges which are obtained from treating some petroleum oils are relatively rich in sulphur bodies. These sulphuric acid sludges upon hydrolysis yield acid oils which if neutralized and distilled within proper limits can be added as odorants or denaturants to various materials. One use for the same is as an odorant in natural gas, so that such gas will give a noticeable odor if there is a leak in the gas line. Another important use of these acid oils is for the purpose of denaturing alcohol or various esters.

A particularly valuable form of sludge for producing acid oils capable of use as odorants or denaturants is the sulphuric acid sludge obtained from the sulphuric acid treatment of pressure naphtha, i. e. the sulphuric acid sludge obtained in the treatment of low boiling point oils produced by the modern type of cracking process.

I have discovered that when such acid sludge is mixed with the mother liquor used in the process of making ammonium sulphate, the mother liquor is capable of hydrolyzing the sludge and separating the sludge into free sulphuric acid capable of reacting with ammonia to form ammonium sulphate and also into acid oils which can be separated from the mother liquor neutralized and distilled and then used either as a denaturant or an odorant. In such a process, there is involved essentially the hydrolysis of the acid sludge by the mother liquor solution, which consists essentially of a solution of ammonium sulphate containing some sulphuric acid. Inasmuch as the hydrolysis is carried out at a comparatively low temperature, the acid oil which separates contains the light fractions which are valuable as odorant or denaturant materials. It appears that the ammonium sulphate content of the mother liquor acts during the hydrolysis operation upon the acid sludge to give in some manner an exceptionally clean separation of the acid oil from the hydrolyzed free sulphuric acid.

The present invention, together with various advantages and objects of the same, will be more readily understood from the following description of the preferred form or example of a process embodying my invention.

The process is described in connection with the accompanying drawing, which illustrates diagrammatically an apparatus for performing the process.

In the drawing, 1 indicates an apparatus for treating petroleum oil with sulphuric acid, the acid entering the apparatus through the line 2, the petroleum distillate entering through the line 3, and the two passing through a mixer 4 into a treater 1. The treated oil is withdrawn from the top, as indicated at 5, whereas the acid sludge produced is withdrawn from the line 5. 6 indicates another well-known form of apparatus for for producing acid sludge, in which the acid is introduced through line 7, petroleum distillate through line 8, and the acid sludge withdrawn through the line 9. Either the acid sludge in line 9 or that in line 5 may be passed through one of two forms of apparatus for producing ammonium sulphate therefrom. In one case, the acid sludge is introduced by line 10 into a hydrolizing chamber 11. Line 12 is indicated for introducing steam into the hydrolizing chamber, if desired. Line 13 indicates a line for passing mother liquor from the process likewise into the hydrolizing chamber 11. The acid oil from the chamber 11 is withdrawn through line 14 and then introduced into a still 15 connected with the usual tower 16. 17 indicates a line leading the condensed distillate to a storage tank 18 for the collection of the distilled acid oils. The aqueous layer from the hydrolizing chamber 11 is indicated as passed by line 19 into an ammonium absorber and saturator 20. Ammonia is introduced into such saturator from ammonia tank 20$a$ by line 21. Steam also may be introduced through the line 22. From the saturator 20 the liquid is withdrawn through a settler 23, from which it may be discharged to a centrifuge 24, from which the mother liquor may be spun from the ammonium sulphate crystals and returned through the line 13. Ammonium sulphate crystals discharge from the centrifuge into a drier 25 in which they are dried and thence discharged to storage.

In the alternate form of the apparatus, the separation of the acid oil may follow the ammonium absorption reaction. Thus, acid sludge from either line 9 or line 5 may be introduced in the ammonium absorber and saturator 26 along with mother liquor from the line 27. Ammonia may be introduced through the line 28. From the saturator the sludge passes into a settler 29, from which the acid oil or tar is withdrawn from line 30. The aqueous solution is passed into a settler and cooler 31 and hence to a centrifuge 32, in which the mother liquor is spun from the ammonium sulphate crystals and the mother liquor returned through line 27. Ammonium sulphate from the centrifuge is withdrawn, as indicated at 33.

In the preferred form of the invention, the process is a cyclic one, that is to say, there is derived the mother liquor at the end of the process which consists mainly of water, ammonium sulphate and sulphuric acid. This mother liquor is added to the acid sludge to be hydrolyzed. For example: a mother liquor containing 1483 grams of water, 1185 grams of ammonium sulphate and 194 grams of sulphuric acid may be considered as one of typical composition, and this liquor has been previously cooled to atmospheric temperature and saturated with ammonium sulphate. To this liquor there is added, for example, 668.9 grams of pressure naphtha sulphuric acid sludge, that is, a sulphuric acid sludge obtained by treating with strong acid low boiling point distillates obtained from a thermal cracking process applied to petroleum oils.

In the drawing the acid sludge is indicated as passing through either the line 9 or the line 5 into either the hydrolizing chamber 11 or directly into ammonium absorber and saturator 26. In the first case, mother liquor is added through line 13, and in the second case mother liquor is added through line 27.

Upon the addition of the acid sludge to the mother liquor a hydrolysis occurs, accompanied by a considerable rise in temperature and evaporation of some of the water. At the same time, there is a separation of the acid sludge into an acid oil, which separates from the aqueous phase. A hydrolizing chamber 11 is indicated as forming two layers, the upper being the acid oil and the lower the aqueous phase. This acid oil has an acidity of about 4%, and in the particular example given it was found that 282 grams of such acid oil would separate. The acid oil is preferably separated from the aqueous solution before contacting the aqueous solution with ammonia, although this is perhaps not essential as means might be provided for separating the same after the addition of ammonia or during the addition of ammonia. In one form of the apparatus the acid oil is indicated as separated from the aqueous phase in the hydrolizing chamber 11 before the aqueous phase is introduced in the ammonia saturator 20, whereas in the other form of apparatus the acid oil admixed with the aqueous phase is directly contacted with ammonia in the absorber 26. The acid oil thus obtained is neutralized with sodium hydroxide, sodium carbonate, or other suitable neutralizing agents for the purpose of neutralizing any free mineral acid present, but not for the purpose of neutralizing any organic acids. The neutralized acid oil is then distilled for the production of a desired odorant or denaturant. As indicated, the acid oil may be withdrawn from the hydrolizing chamber 11 and passed through line 14 to the still 15. Either within or without the still the acid oil may be neutralized and then distilled for the production of a desired odorant or denaturant which is collected in the storage vessel 18.

In the particular example given, 26% by volume of the original acid sludge was obtained as a finished odorant or denaturant and possessed the following properties:

| | |
|---|---|
| Gravity A. P. I. | 24.5 |
| Per cent sulphur | 9.70 |
| A. S. T. M. | |
| St | 189° F. |
| 20 | 295 |
| 50 | 413 |
| 90 | 580 |

Preferably, after the separation of the acid oils produced by the hydrolysis the aqueous solution is contacted with ammonia gas in any usual or desired manner, such as by passing the same through line 19 through ammonia gas saturator 20 at about 220° F. Sufficient ammonia is added to combine with all of the mineral acid in solution, although preferably there is a slight excess of acid maintained. After the saturation operation, the solution is preferably cooled to atmospheric temperature at which time ammonium sulphate will crystalize from the solution, by passing the solution from the saturator into the settler or cooler 23. The ammonium sulphate is filtered and washed from the solution, preferably the wash water being returned to the solution. As indicated, this filtration may be accomplished in the conventional centrifuge 24. In this manner, in the particular example given, about 267 grams of ammonium sulphate is obtained as a final product. The mother liquor remaining after the precipitation of the ammonium sulphate is re-cycled, as before stated, to the beginning of the process.

By the process of the present invention, I am able to secure a production of ammonium sulphate at the same time with the production of acid oils, and the material utilized in the process, i. e., the acid sludge, is comparatively valueless material so that the process results in a lower cost in production of ammonium sulphate simultaneously with the production of an additional valuable product.

While the process herein described is well adapted to carry out the objects of the invention, it is to be understood that various modifications and changes may be made, all without departing from the principles of the invention, and this invention includes all such modifications and changes as come within the scope of the appended claims.

I claim:

1. A cyclic process of producing ammonium sulphate and an acid oil, which comprises hydrolyzing about one part of sulphuric acid sludge derived from the treatment of petroleum oils with about four parts of mother liquor containing principally ammonium sulphate and some sulphuric acid, to separate the same into an acid oil suitable for use as an odorant and an inorganic phase, separating the acid oils resulting from such hydrolysis, contacting the aqueous phase with ammonia for the production and precipitation of ammonium sulphate, and returning the mother liquor remaining after the separation of the ammonium sulphate as the motor liquor to the first step of the process.

2. A process of producing ammonium sulphate and acid oils suitable as odorants and denaturants from ammonia and sulphuric acid sludges, which comprises adding to about four parts of mother liquor from a previous cycle about one part of such sulphuric acid sludge derived from the treatment of petroleum and containing a material sulphur content so as to hydrolyze the acid sludge and produce acid oils, suitable as odorants and an aqueous acid solution, separating the acid oils from the remaining aqueous solution, contacting the aqueous solution with ammonia gas to nearly neutralize the free sulphuric acid, and cooling the solution to precipitate ammonium sulphate, separating the produced ammonium sulphate from the mother liquor, and returning the mother liquor to the hydrolyzing operation.

3. A process of producing ammonium sulphate and an acid oil, which process comprises adding ammonium sulphate mother liquor to a petroleum sulphuric acid sludge in amount sufficient to effect a substantially complete hydrolysis of the sludge, whereby the acid sludge is hydrolyzed and immiscible layers of acid oil and aqueous liquid caused to form, separating the acid oil from the aqueous liquor, contacting the separated aqueous layer with gaseous ammonia at temperatures increasing to a temperature above the boiling point of water, in amounts sufficient to substantially but not completely to neutralize the free sulphuric acid present, cooling the slightly acidic ammonium sulphate liquor and separating crystallized ammonium sulphate crystals therefrom, washing the separated ammonium sulphate crystals and returning the wash water to the ammonium sulphate mother liquor, and recycling the mother liquor containing the added wash water as a diluent to the first-mentioned operation.

4. A process of producing ammonium sulphate and an acid oil, which comprises adding ammonium sulphate mother liquor to a petroleum sulphuric acid sludge in amounts sufficient to effect substantially complete hydrolyzation of the sludge, whereby the acid sludge is hydrolyzed and immiscible layers of acid oil in aqueous liquor caused to form, separating the acid oil from the aqueous layer, contacting the separated aqueous layer with gaseous ammonia at temperatures increasing to a temperature above the boiling point of water, in amounts substantially but not completely to neutralize the free sulphuric acid present, cooling the slightly acidic ammonium sulphate liquor and separating crystallized ammonium sulphate crystals therefrom, and recycling the mother liquor to said first-mentioned operation.

5. A process of producing ammonium sulphate and an acid oil, comprising adding an ammonium sulphate mother liquor to a petroleum sulphuric acid sludge in amounts sufficient to effect substantially complete hydrolysis of the sludge, whereby the acid oil is hydrolyzed and immiscible layers of acid oil and aqueous liquor caused to form, separating the acid oil from the aqueous layer, contacting the separated aqueous layer with gaseous ammonia in amounts substantially but not completely to neutralize the free sulphuric acid present, cooling the slightly acidic sulphate liquor and separating crystallized ammonium sulphate crystals therefrom, and recycling the mother liquor to said first-mentioned operation.

6. A process of producing ammonium sulphate and an acid oil, comprising adding an ammonium sulphate mother liquor to a petroleum sulphuric acid sludge in amounts sufficient to effect substantially complete hydrolysis of the sludge, whereby the acid oil is hydrolyzed and immiscible layers of acid oil and aqueous liquor caused to form, separating the acid oil from the aqueous layer, contacting the separated aqueous layer with gaseous ammonia in amounts substantially but not completely to neutralize the free sulphuric acid present, cooling the slightly acidic sulphate liquor and separating crystallized ammonium sulphate crystals therefrom, washing the separated ammonium sulphate crystals and returning the wash water to the ammonium sulphate mother liquor, and recycling the mother liquor containing such wash water to the first operation.

7. A process of producing ammonium sulphate and an acid oil, which process comprises adding about four parts of ammonium sulphate mother liquor to about one part of petroleum sulphuric acid sludge without the application of extraneous heat so as to effect a substantially complete hydrolysis of the sludge into immiscible layers of acid oil and an aqueous liquid, separating the acid oil from the aqueous liquid, contacting the separated aqueous liquid with gaseous ammonia in amounts sufficient to substantially but not completely neutralize the free sulphuric acid present, cooling the slightly acidic ammonium sulphate liquor, separating the crystallized ammonium sulphate crystals therefrom, and recycling the mother liquor to said first-mentioned operation.

8. A process of producing ammonium sulphate and an acid oil, which process comprises adding about four parts of ammonium sulphate mother liquor to about one part of petroleum sulphuric acid sludge to effect substantially complete hydrolization of the sludge into immiscible layers of acid oil and aqueous liquor, separating the acid oil from the aqueous liquor, contacting the aqueous liquor with gaseous ammonia at a temperature increasing to above the boiling point of water in amounts to substantially but not completely neutralize the free sulphuric acid present, cooling the slightly acidic ammonium sulphate liquor formed and separating crystallized ammonium sulphate therefrom, and recycling the mother liquor to the said first-mentioned operation.

JOHN T. RUTHERFORD.